United States Patent [19]

Schoenenberger et al.

[11] 4,125,550

[45] Nov. 14, 1978

[54] REMOVAL OF FREE FATTY ACIDS FROM WATER IMMISCIBLE FLUIDS VIA ION EXCHANGE RESINS

[75] Inventors: Karl A. Schoenenberger, Geroldswil, Switzerland; William Fries, Southampton, Pa.

[73] Assignee: Rohm and Haas Company, Philadelphia, Pa.

[21] Appl. No.: 728,107

[22] Filed: Sep. 30, 1976

[51] Int. Cl.$^2$ ............................. C09F 5/10; C11B 3/00
[52] U.S. Cl. ................................. 260/428; 252/420; 210/32
[58] Field of Search ............... 260/419, 420, 425, 427, 260/428, 428.5; 252/420; 210/32

[56] References Cited

U.S. PATENT DOCUMENTS

| | | | |
|---|---|---|---|
| 2,456,428 | 12/1948 | Parker | 260/420 |
| 2,667,417 | 1/1954 | Delmousee et al. | 260/428 X |
| 2,771,480 | 11/1956 | Chasanov et al. | 260/420 |
| 3,221,008 | 11/1965 | Wolf et al. | 260/419 X |
| 3,377,369 | 4/1968 | Sargent et al. | 260/419 X |
| 3,950,365 | 4/1976 | Singer et al. | 260/419 |

*Primary Examiner*—John Niebling
*Attorney, Agent, or Firm*—John E. Taylor, III

[57] ABSTRACT

Certain anion exchange resins are used for the removal of free fatty acids from water immiscible fluids. This anion exchange system can function without the necessity of organic solvents and with the resin in a hydrous state.

10 Claims, No Drawings

REMOVAL OF FREE FATTY ACIDS FROM WATER IMMISCIBLE FLUIDS VIA ION EXCHANGE RESINS

This invention relates to, and has as its object, the use of anion-exchange resins in their hydrous state for the removal of organic acids from water-immiscible fluids without the necessity of using organic solvents. It also relates to, and has as an object, the subsequent removal of the adsorbed free fatty acids and other adsorbed impurities from the resins and restoration of the free-fatty-acid removal capacity of the resins.

Heretofore, successful use of ion-exchange resins to treat water-immiscible fluids has required that the hydrous resins be pretreated with an organic solvent that is miscible with both water and the fluid to be treated. Failure to pretreat the resins with such a solvent was thought to exclude the fluid being treated from intimate contact with the hydrated functional groups in the resin, and to result in highly inefficient or negligible treatment of the fluid. Also, successful regeneration of the resins was thought to require use of the same water-and-fluid-miscible solvent to return the resins to their fully hydrated state. Because cross-contamination of the various fluids necessitated expensive solvent recovery and purification, this conventional ion-exchange resin technique was impractical.

The fluids toward whose refining the process of this invention is directed include glyceride oils, as exemplified by soybean, peanut, anchovy, cottonseed and coconut oils. They are conventionally refined by the sequential steps of degumming, neutralizing and extracting free fatty acids, bleaching, deodorizing, and partially decolorizing. The most troublesome and costly step, which accounts for 90% of the entire refining cost, is the neutralization and removal of free fatty acids (FFA). Current industrial requirements for this step include FFA reduction to a level below 0.1% FFA. Aqueous caustic extraction is typically used in commercial processes. Although such extraction is generally effective in reducing the FFA content to levels of about 0.03%, it is accompanied by a loss of up to 10% of the oil. The separation process, usually centrifugation, is unable to separate this oil from the sodium soaps of the FFA which form during the caustic extraction.

Interest in the use of ion-exchange resins for removal of FFA from oils arose in the 1950's, as shown by Chasanov, et al, U.S. Pat. No. 2,771,480, however, no commercial use of ion-exchange resins in this area has developed. The Chasanov patent described use of gellular, styrene-based, quaternary anion-exchange resin for adsorption of the FFA. Alcohol solvation of the resin and use of alcoholic caustic solution or aqueous caustic solution containing a surfactant as a regenerant were found to be necessary to the process. As a result of these apparent necessities, the process produced a solvent containing mixtures of alcohol with oil and alcohol with water. Solvent recovery was expensive, and discarding the solvent was not only expensive, but caused unacceptable pollution as well.

A more recent ion-exchange process employed a weakly basic, macroreticular resin prepared from a macroreticular, crosslinked styrene-divinylbenzene polymer by chloromethylation followed by amination with dimethylamine. The FFA removal was a complicated process which used the two organic solvents, hexane and isopropanol and the refined oil contained a marginally unsatisfactory 0.1% FFA. Solvent recovery, necessary to reduce solvent consumption and prevent pollution, required separate, costly distillations. The sequential steps of the process were adsorption of FFA from the oil by hexane-solvated resin; hexane displacement of residual oil after the oil had been treated; FFA removal from the resin by isopropanol displacement, the FFA being recovered by flash evaporation of the isopropanol; and hexane treatment to re-solvate the resin.

Other anion-exchange processes for removal of FFA from oils, such as those described by Ollero and Soto, have employed weakly basic or strongly basic, gellular resins which were water wet for direct FFA adsorption. The oils after treatment contained FFA levels well above the 0.1% maximum limit for industrial requirements, thus rendering these processes impractical. The removal of FFA from these resins employed either organic solvents or aqueous caustic solution, which had the disadvantage of precipitating soap within the resin, thus reducing its effectiveness for further adsorption cycles, and markedly reducing its useful life.

In the present invention the process surprisingly permits the removal of organic acids, including FFA, from water-immiscible fluids through the use of macroreticular, quaternary anion-exchange resins in hydroxyl form which have been solvated with only water, and the subsequent removal of the adsorbed organic acids from the resins and restoration of their acid-removal capacity using totally aqueous solutions free from water-miscible organic solvents. A solvent is optionally employed in this process only to wash the residual treated fluid from the resin at the completion of the fluid treatment step. This minimal use of solvent eliminates excessive resin swelling, greatly reduces expensive replacement or recovery of solvent, and minimizes the air pollution problems and toxic hazards associated with solvent use. The use of aqueous, mineral acid solutions free from organic solvents to elute adsorbed organic acids from the resins prevents soap formation within the resin when the caustic regenerant is introduced; this contributes to significantly longer useful life of the resins. The organic acid content of fluids which have been treated according to this process is typically about 0.03% or lower, thus in the case of glyceride oils the quality of the treated oils is equivalent to that of oils treated according to the more expensive, commercial processes.

The organic acid removal steps in the process according to the invention comprise:

(1) Contacting the organic-acid-containing fluid with the water-solvated macroreticular, quaternary anion exchange resin in its hydroxyl form either by agitating the resin and fluid together in a container, followed by separating them by filtration or centrifugation, or preferably by allowing the fluid to flow through a column containing the resin;

(2) Collecting the treated fluid;

(3) Optionally displacing the residual fluid from the column with either a solvent or, in the case of glyceride oils treated for removal of FFA, an oil with a high FFA content;

(4) Displacing the residual treated fluid, high-FFA-content oil, or solvent from the column with water;

(5) Displacing the organic acid from the resin with a dilute, aqueous solution of a mineral acid, for example sulfuric acid, nitric acid or hydrochloric acid;

(6) Rinsing the mineral acid from the resin with water;

(7) Regenerating the resin to the hydroxyl form with a dilute, aqueous solution of caustic, for example sodium hydroxide or potassium hydroxide, and (8) Rinsing the excess caustic from the resin with water.

The following examples are presented to illustrate actual and typical use of the present invention. All percentages referred to in the example, are weight percentages unless otherwise stated.

EXAMPLE 1

The anion exchange resin used was a macroreticular, crosslinked acrylic polymer aminolyzed with dimethylaminopropylamine and then quaternized with methyl chloride; it is subsequently referred to as Resin 1. Forty milliliters of hydrated Resin 1 in the hydroxyl form were placed in a ½-inch-diameter buret column and classified by backflushing with water. Previously degummed soybean oil, containing 0.6 to 1.7% FFA, was introduced to the top of the column and was allowed to flow by gravity through the resin bed at a flow rate of one bed volume (BV) per hour and a temperature of 25° C. The FFA content of the effluent oil was monitored, and was found to average 0.03% throughout the run, until sufficient FFA had been adsorbed to exhaust the resin capacity; at this point the FFA level of the effluent oil rose sharply. The regeneration of the resin was begun by rinsing the resin bed with two BV of water, which displaced the residual oil. Two BV of 10% aqueous sulfuric acid solution were introduced at the bottom of the column and forced to flow upwards through the resin. This treatment of the resin eluted the adsorbed FFA, which floated on the acid solution as a separate phase, and which contained approximately 20% FFA. This phase was removed, and the resin bed was washed with two BV of water to remove the residual sulfuric acid. The resin was regenerated from the sulfate form to the hydroxyl form by allowing four BV of 4% aqueous sodium hydroxide solution to flow through the column by gravity; residual sodium hydroxide solution was rinsed from the bed with two BV of water, leaving the resin ready for another FFA removal cycle. During three of these complete FFA removal cycles the FFA capacity of the resin bed averaged 60 grams of FFA per liter of resin. Following decolorization and deodorization steps equivalent to those of the usual commercial process, the resultant refined oil was found to be identical in quality to commercially refined oil.

EXAMPLE 2

The experiment of Example 1 was repeated using fresh resin with the modification that one BV of a high-FFA content oil, containing approximately 50% FFA, was used to displace the last bed volume of treated oil from the resin bed at the end of the oil treatment step. This resulted in recovery of more residual oil, and in elution by dilute sulfuric acid of a FFA-containing phase with 50% or more FFA. This treatment-regeneration cycle was repeated eighteen more times, during which the capacity of the resin bed averaged 60 grams of FFA per liter of resin.

EXAMPLE 3

The experiment of Example 1 was repeated using fresh resin with the modification that the resin bed was rinsed with two BV of hexane at the end of the oil treatment step. This rinse completely displaced all the residual oil from the resin, and the acid-eluted FFA phase was found to contain 95% FFA. During eleven complete treatment-regeneration cycles the capacity of the resin bed averaged 70 to 90 grams of FFA per liter of resin. Anchovy oil as well as soybean oil was treated using this process, with identical results.

The process for removing FFA from edible oils may be extended to treatment of oils, organic solvents, monomers and similar materials for removal of FFA, lower-molecular-weight acids down to and including acetic acid, hydroquinones, nitrophenols, catechols and other components, of acidic nature.

EXAMPLE 4

The experiment of Example 1 was repeated with the modification that Resin 2, a macroreticular, divinylbenzene-styrene crosslinked polymer which is chloromethylated and then aminated with dimethylethanolamine, was substituted for Resin 1, and hexane containing 5.2% acetic acid was the fluid treated. The resin capacity was found to be 4.19 milliequivalents of acid per milliliter of resin; until this quantity of acid had been removed by the resin, the average acetic acid content of the treated hexane was found to be 0.01%. The resin capacity and the acid content of the treated hexane remained the same during two complete treatment regeneration cycles.

EXAMPLE 5

The experiment of Example 4 was repeated, treating the following fluids with the resins listed:

| Fluid Treated | Acid Removed | Resin Capacity as g Oleic Acid/L Resin | |
|---|---|---|---|
| | | Resin 1 | Resin 2 |
| Soybean Oil | 0.67% Butyric Acid | 169 | 353 |
| Mineral Oil | 0.60% Butyric Acid | 135 | 340 |
| Benzene | 0.64% Butyric Acid | 174 | 276 |
| Pentachloro-ethane | 0.61% Butyric Acid | 230 | 400 |
| Methyl Methacrylate | 25 ppm Hydroquinone | Large | |
| Methyl Methacrylate | 15 ppm Methoxyhydroquinone | Large | |
| Vinyl Benzyl Chloride | 67 ppm o-Nitrophenol + 34 ppm t-Butylcatechol | | |
| Styrene | 10 ppm t-Butylcatechol | | |

EXAMPLE 6

The experiment of Example 1 was repeated with the modification that a hexane rinse equivalent to two BV followed the FFA elution with dilute sulfuric acid solution, in order to aid the elution. In similar, separate experiments other solvents than hexane were used, including isopropanol and acetone. During several complete treatment-regeneration cycles following this procedure the capacity of the resin averaged 90 grams of FFA per liter of resin.

EXAMPLE 7

The experiment of Example 2 was repeated with the modification that the dilute sulfuric acid solution was heated to about 80° C. before being introduced to the column. During five complete treatment-regeneration cycles the capacity of the resin averaged 70 grams FFA per liter of resin.

We claim:

1. Method for removing free organic acids from a non-aqueous, water immiscible liquid which comprises:

(1) bringing said fluid into contact with particles of a water-solvated, macroreticular, strong-base, quaternary anion-exchange resin in its hydroxyl form;
(2) adsorbing said acids onto said resin;
(3) separating said fluid from said resin; and
(4) regenerating said resin to its original form using aqueous regenerants.

2. Method according to claim 1 wherein the water-immiscible liquid is a glyceride oil and the free organic acids are free fatty acids.

3. Method according to claim 1 wherein said resin is a macroreticular, crosslinked acrylic polymer aminolyzed with dimethylaminopropylamine and then quaternized with methyl chloride.

4. Method according to claim 1 wherein said resin is a macroreticular, crosslinked styrene polymer which is chloromethylated and then aminated with dimethylethanolamine.

5. Method according to claim 3 wherein the free organic acids are free fatty acids, and the water-immiscible liquid is a glyceride oil.

6. Method according to claim 4 wherein the free organic acids are free fatty acids, and the water-immiscible liquid is a glyceride oil.

7. Method according to claim 5 wherein the glyceride oil is selected from the group comprising cottonseed oil, soybean oil, peanut oil, corn oil, anchovy oil and coconut oil, said oil is treated at usual ambient temperatures in an essentially organic-solvent-free state, and the means for separating the oil from the resin involves displacing the oil with water.

8. Method according to claim 2 wherein the content of free fatty acids is about 0.03% or less in the glyceride oil after treatment.

9. Method according to claim 5 wherein the content of free fatty acids is about 0.03% or less in the glyceride oil after treatment.

10. Method according to claim 1 wherein the regeneration step involves eluting the adsorbed acids with an aqueous solution of a mineral acid, and thereafter contacting the resin with a water rinse followed by an aqueous solution of caustic alkali to restore the resin to the hydroxyl form.

* * * * *